United States Patent [19]

Furukawa et al.

[11] Patent Number: 4,610,455
[45] Date of Patent: Sep. 9, 1986

[54] STEERING SYSTEM FOR FRONT AND REAR WHEELS

[75] Inventors: Yoshimi Furukawa, Saitama; Shoichi Sano, Tokyo, both of Japan

[73] Assignee: Honda Giken Kogyo Kabushiki Kaisha, Tokyo, Japan

[21] Appl. No.: 658,190

[22] Filed: Oct. 5, 1984

[30] Foreign Application Priority Data

Oct. 6, 1983 [JP] Japan ............................ 58-187600

[51] Int. Cl.$^4$ ............................................. B62D 7/00
[52] U.S. Cl. ........................................ 280/91; 280/99
[58] Field of Search ............... 280/91, 701, 96, 98, 280/99, 103; 180/140, 141, 142; 74/571 L, 831, 834, 836

[56] References Cited

U.S. PATENT DOCUMENTS

| | | |
|---|---|---|
| 4,105,086 | 8/1978 | Ishii et al. ............................. 280/91 |
| 4,313,514 | 2/1982 | Furukawa et al. .................... 280/91 |
| 4,522,416 | 6/1985 | Sano et al. ............................ 280/91 |

FOREIGN PATENT DOCUMENTS

2124167 2/1984 United Kingdom ................. 280/91

*Primary Examiner*—John J. Love
*Assistant Examiner*—Ross Weaver

*Attorney, Agent, or Firm*—Irving M. Weiner; Joseph P. Carrier; Pamela S. Burt

[57] ABSTRACT

A steering system for front and rear wheels of a motor vehicle wherein the steering ratio of the rear wheels to the front wheels is variable dependent on the speed of the motor vehicle. The steering system includes a steering wheel, front wheels, a first assembly for steering the front wheels, rear wheels, a second assembly for steering the rear wheels, and a third assembly which transmits the direction and extent of steering of the front wheels to the second assembly, a fourth assembly controls the steering ratio between the front and rear wheels in response to a signal indicative of the speed of the motor vehicle or a signal related to the speed of the motor vehicle. Each of the rear wheels has a kingpin having a central line which has an extension which is positioned rearwardly of a point where a vertical line passing through the center of an axle of the rear wheel intersects the ground on which the motor vehicle is placed. The steering system provides a facilitated compensating operation of the steering wheel by increasing a reactive force against steering which allows the driver to return the steering wheel of its own accord without excessively turning the steering wheel upon vehicle deceleration, and reducing the reactive force to allow the driver to turn the steering wheel of its own accord upon vehicle acceleration.

4 Claims, 6 Drawing Figures

(a)

(b)

(c)

STEERING SYSTEM FOR FRONT AND REAR WHEELS

BACKGROUND OF THE INVENTION

1. Field of the Invention:

The present invention relates to a steering system for front and rear wheels of a motor vehicle wherein the steering ratio of the rear wheels to the front wheels is variable dependent on the speed of the motor vehicle.

2. Description of the Prior Art:

There has been proposed a steering system for front and rear wheels of a motor vehicle (Japanese Patent Application No. 56-134888 filed on Aug. 2, 1982 and laid-open on Feb. 10, 1984 under JP-A-59-26363). According to the proposed steering system, a front wheel steering mechanism and a rear wheel steering mechanism are operatively interconnected, and the steering ratio of the rear wheels to the front wheels is variable dependent on the speed of the motor vehicle. More specifically the rear wheels are steered in opposite phase with the front wheels, or substantially not steered at lower vehicle speeds, and the rear wheels are steered in phase with the front wheels at higher vehicle speeds.

When the motor vehicle is decelerated while the steering angle is kept constant at the time the motor vehicle is turned with the rear and front wheels steered in phase at a higher vehicle speed, the proposed steering system causes the steering angle of the rear wheels to be reduced, that is, the steering system causes the difference between steering angles of the front and rear wheels to vary, with the result that the radius of turning movement of the motor vehicle varies. Conversely, when the vehicle speed is increased at a constant steering angle, the radius of turning movement of the vehicle is increased, that is, understeer results.

Many ordinary motor vehicles in which the rear wheels are not steerable are designed to exhibit understeer for stability during high-speed travel of the motor vehicle. When the motor vehicle with an understeering tendency is decelerated, the radius of a turn is also reduced. However, the motor vehicle equipped with the system for varying the steering ratio of the rear wheels to the front wheels dependent on the vehicle speed tends to understeer at a greater rate than the ordinary motor vehicles.

Therefore, the driver of a motor vehicle with such a variable steering ratio is required to perform a greater compensatory operation of the steering wheel for an increase or reduction in the vehicle speed than would be required with a motor vehicle of ordinary construction having unsteerable rear wheels.

SUMMARY OF THE INVENTION

With the above drawback in view, it is an object of the present invention to provide a steering system for front and rear wheels of a motor vehicle wherein the steering ratio of the rear wheels to the front wheels is variable dependent on the speed of travel of the motor vehicle, the steering system providing a facilitated compensating operation of the steering wheel for vehicle acceleration or deceleration while the vehicle is being steered, by increasing a reactive force against steering to allow the driver to return the steering wheel of its own accord without excessively turning the steering wheel upon deceleration of the motor vehicle, and reducing the reactive force to allow the driver to turn the steering wheel of its own accord upon acceleration of the motor vehicle.

To achieve the above object, there is provided according to the present invention a steering system for front and rear wheels of a motor vehicle, comprising a steering wheel, front wheels, first means for steering the front wheels, rear wheels, second means for steering the rear wheels, third means for transmitting the direction and extent of steering of the front wheels to the second means, and fourth means for controlling the steering ratio between the front and rear wheels in response to a signal indicative of the speed of the motor vehicle or a signal related to the speed of the motor vehicle. Each of the rear wheels has a kingpin having a central line which has an extension which is positioned rearwardly of a point where a vertical line passing through the center of an axle of the rear wheel intersects the ground on which the motor vehicle is disposed.

The above and other objects, features and advantages of the present invention will become more apparent from the following detailed description when read in conjunction with the accompanying drawings in which a preferred embodiment of the present invention is shown by way of illustrative example.

DETAILED DESCRIPTION OF THE PREFERRED EMBODIMENT

Figure 1:
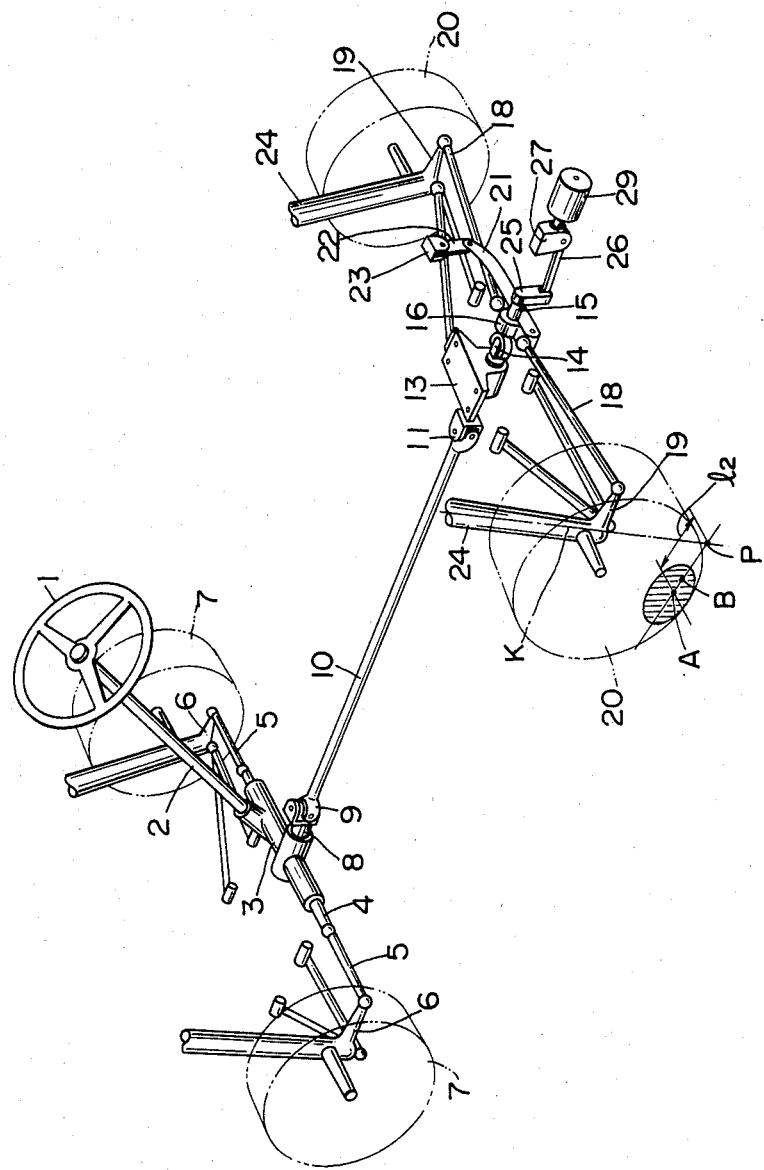
FIG. 1 is a perspective view of a steering system for front and rear wheels of a motor vehicle according to the present invention

As shown in FIG. 1, a steering wheel 1 has a steering shaft 2 operatively coupled to a rack-and-pinion gear box 3 having a rack shaft 4 connected at opposite ends to tie rods 5, 5 to which there are coupled knuckle arms 6, 6 supporting front wheels 7, 7, respectively. The front wheels 7, 7 can be steered in a direction in which the steering wheel 1 is steered.

A pinion shaft 8 extends rearwardly from the gear box 3 and has a rear end connected through a universal joint 9 to an elongated linkage shaft 10 connected at a rear end thereof through a universal joint 11 to an input shaft 12 (FIG. 2) joined to a rear wheel steering mechanism. The input shaft 12 is disposed on a longitudinal central axis of a rear vehicle body portion (not shown), and is rotatably supported by a bearing bracket 13.

Figure 2:
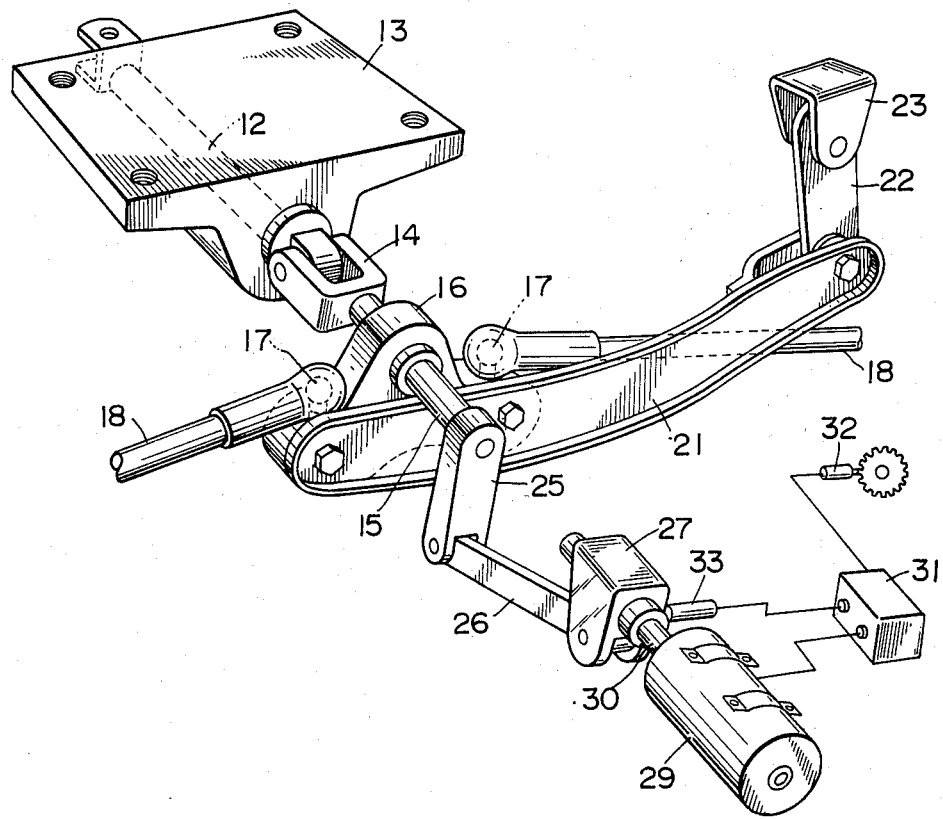
FIG. 2 is an enlarged perspective view of a rear wheel steering mechanism in the steering system shown in FIG. 1

To a rear end of the input shaft 12, there is operatively coupled through a universal joint 14 a swing shaft 15, as shown in detail in FIG. 2, having an intermediate portion over which a joint member 16 is loosely fitted. The joint member 16 is operatively connected at lateral ends thereof to tie rods 18, 18 through ball-and-socket joints 17, 17, respectively. The joint member 16 is swingably supported on the vehicle body by links 21, 22 and a bracket 23. Knuckle arms 19, 19 supporting rear wheels 20, 20, respectively, are coupled to outer ends of the tie rods 18, 18, respectively. Shock absorbers 24, 24 are connected respectively between upper ends of the knuckle arms 19, 19 and the vehicle body.

Figure 3:
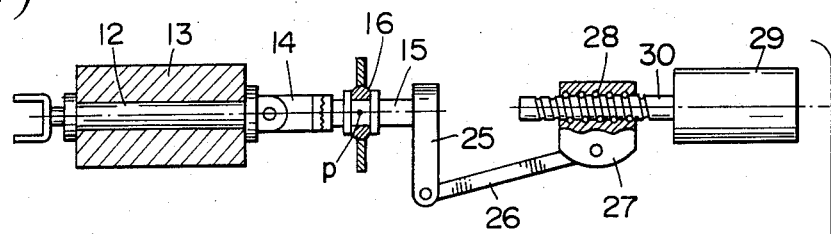
FIGS. 3a through 3c are sectional side elevational views showing the principle of operation of the rear steering mechanism illustrated in FIG. 2
Figure 3:
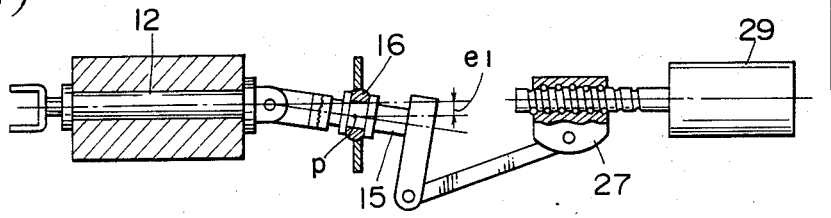
Figure 3:
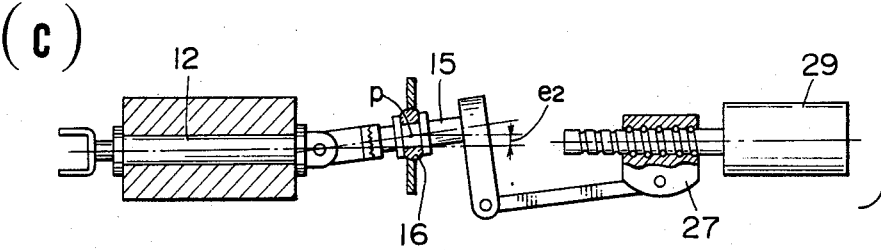

An arm 25 is fixed to a rear end of the swing shaft 15 and extends at a right angle to the axis of the swing shaft 15. To a lower end of the arm 25, there is pivotably attached a link 26 having a rear end pivotably connected to a slider 27 through which an output shaft 30 of a motor 29 is threaded via a ball screw mechanism 28, as shown in FIGS. 3a through 3c. The motor 29 is secured to the vehicle body with the output shaft 30 disposed coaxially with and rearwardly of the input shaft 12.

The motor vehicle has a control circuit 31 (FIG. 2) for applying a control signal dependent on the vehicle speed to the motor 29 in response to a signal generated by a speed sensor 32 for detecting the vehicle speed and a signal generated by a positional sensor 33 for detecting the position of the slider 27.

Operation of the steering system is as follows:

When the slider 27 is positioned as shown in FIG. 3a with a pivot point p of the joint member 16 being aligned with the central axis of the input shaft 12, the input shaft 12 and the swing shaft 15 turn coaxially and the joint member 16 does not swing laterally. Therefore, the tie rods 18, 18 remain stationary, and only the front wheels 7, 7 are steered, with the rear wheels 20, 20 not being steered.

When the speed of travel of the motor vehicle is below a preset value, the control circuit 30 is responsive to a signal from the speed sensor 32 to control rotation of the motor 29 dependent on the detected speed of the vehicle for thereby moving the slider 27 in a forward direction as illustrated in FIG. 3b. When the slider 27 is moved forwardly, the swing shaft 15 is tilted downwardly to displace the pivot point p out of alignment with the axis of the input shaft 12 by a downward interval $e_1$. When the front wheels 7, 7 are steered, the joint member 16 is swung laterally to move the rear wheel tie rods 18, 18 in directions opposite to those in which the front wheel tie rods 5, 5 are moved. Therefore, the rear wheels 20, 20 are steered in opposite phase with the front wheels 7, 7. The steering ratio between the front and rear wheels continuously varies dependent on the vehicle speed.

When the vehicle speed is higher than the preset value, the control circuit 30 reversed rotation of the motor 29 dependent on the vehicle speed to thereby retract the slider 27 in a rearward direction as shown in FIG. 3c. The retracting movement of the slider 27 now tilts the swing shaft 15 upwardly to cause the pivot point p to be displaced out of alignment with the axis of the input shaft 12 by an upward interval $e_2$. Upon steering of the front wheels 7, 7, the rear wheels tie rods 18, 18 are moved in the same directions as those in which the front wheel tie rods 5, 5 are moved. Thus, the rear wheels 20, 20 are steered in phase with the front wheels 7, 7. At this time, the steering ratio between the front and rear wheels also continuously varies dependent on the vehicle speed.

At lower vehicle speeds, the rear wheels are steered in opposite phase with the front wheels, causing the motor vehicle to turn with a small radius so that the motor vehicle can be maneuvered or turned with ease. At higher vehicle speeds, the rear wheels are steered in phase with the front wheels with the result that the motor vehicle can be steered with good responsiveness.

According to the present invention, as shown in FIG. 1, each rear wheel 20 has kingpin axis K having an extension intersecting the ground at a point P which is located rearwardly of the center A of an area through which the rear wheel 20 is in contact with the ground. Therefore, the rear wheel 20 has a negative caster trail $l_2$.

A reactive force against steering will be described hereinbelow.

With an ordinary motor vehicle in which only front wheels are steerable, a torque $T_1$ required for steering the wheel front is given by:

$$T_1 = 1/n \cdot 2l_1 \cdot F_1 \qquad (1)$$

where n is the gear ratio of a steering system, $l_1$ is the caster trail of each front wheel, and $F_1$ is the lateral force (average) generated by the front wheels.

In the steering system in which the rear wheels are steered at a ratio of k to the front wheels, a torque $T_2$ required to steer the rear wheels is expressed by:

$$T_2 = k/n \cdot 2l_2 \cdot F_2 \qquad (2)$$

where $l_2$ is the caster trail of each rear wheel, and $F_2$ is the lateral force (average) generated by the rear wheels. The torque $T_2$ is added to the torque expressed by the equation (1).

Where the point P is located rearwardly of the center B of the lateral force generated by the rear wheels 20, the caster trail $l_2$ in the equation (2) is negative, and the steering torque $T_2$ is also negative.

Accordingly, in the steering system of the embodiment in which the steering ratio k of the rear wheels to the front wheels is increased as the vehicle speed increases the absolute value of the negative torque $T_2$ is increased as the vehicle speed is increased provided the caster trail $l_2$ is negative. As a consequence, the sum of the torques required for steering the front and rear wheels, i.e.,:

$$T = T_1 + T_2$$

becomes smaller as the vehicle speed becomes higher as compared with the ordinary motor vehicle in which only the front wheels are steerable. When the vehicle speed decreases, the torque $T_2$ is increased so that the sum T of the steering torques is greater than the steering torque of the ordinary motor vehicle.

Therefore, the reactive force against steering becomes smaller as the vehicle speed becomes higher as compared with the ordinary motor vehicle.

The center B of the lateral force generated by the rear wheels 20 is actually located rearwardly of the center A of the area of contact of the rear wheels 20 with the ground as shown in FIG. 1. Since the distance between the centers B, A is normally quite small, the center B of the lateral force may be regarded as the center A of the contacting area for practical purposes.

Figure 4:
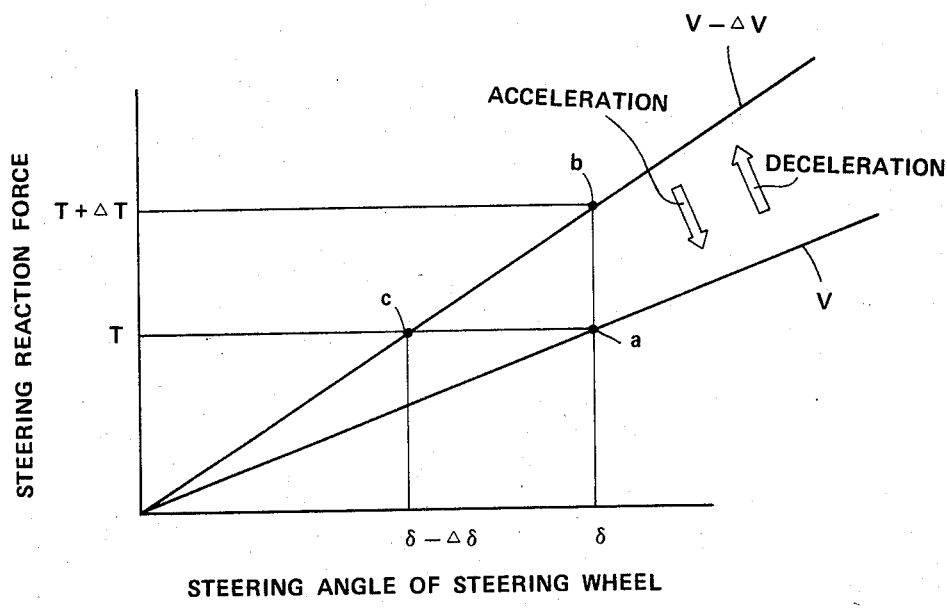
FIG. 4 is a graph showing the relationship between the angle of angular movement of a steering wheel (steering angle) and a reactive force against steering.

With the arrangement of the invention, as described above, the center trail $l_2$ of each rear wheel 20 is negative. Assuming that the reactive force against steering is T (at a point a in FIG. 4) when the steering wheel 1 is turned through an angle $\delta$ while the vehicle is running at a speed of V, the reactive force will be increased to $T + \Delta T$ (at a point b) when the vehicle is decelerated by $\Delta V$ if the steering wheel 1 remains turned through the angle $\delta$. Therefore, if the steering wheel 1 is held by the driver under the same force, the steering wheel 1 is returned (to a point c) of its own accord. Upon acceleration of the motor vehicle, on the other hand, the steering wheel 1 is turned additionally of its own accord.

As described above in detail, the extension of the central line of the kingpin of each rear wheel is located rearwardly of the point where the vertical line passing through the center of the axle of the rear wheel intersects the ground, that is, the caster trail of the rear wheel is negative. With this arrangement, the reactive force against steering is progressively reduced as the speed of travel of the motor vehicle is increased. The reactive force at the time the motor vehicle is decelerated is increased to prevent the driver from excessively turning the steering wheel unconsciously and allowing the driver to return the steering wheel of its own accord. Upon acceleration of the motor vehicle, the reactive force is reduced to allow the driver to turn the steering wheel additionally of its own accord. Therefore, operation of the steering wheel can easily be compensated for acceleration and deceleration of the motor vehicle while the motor vehicle is being steered.

The present invention is applicable to a system in which front and rear wheels are steered under hydraulic pressure and a signal indicative of a steering angle of the front wheels is transmitted in the form of a hydraulic pressure, or a system in which a front wheel steering angle is transmitted as an electric signal to a computer.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A steering system for front and rear wheels of a motor vehicle, comprising:
   (a) a steering wheel;
   (b) front wheels;
   (c) first means for steering said front wheels;
   (d) rear wheels;
   (e) second means for steering said rear wheels;
   (f) third means for transmitting the direction and extent of steering of said front wheels to said second means;
   (g) fourth means for controlling the steering ratio between said front and rear wheels in response to a signal related to the speed of the motor vehicle, said fourth means including a swing shaft connected to said second means which is vertically movable in response to changes in the vehicle's traveling speed; and
   (h) each of said rear wheels having a kingpin having a central line which has an extension which is positioned rearwardly of a point where a vertical line passing through the center of an axle of said rear wheel intersects the ground on which the motor vehicle is disposed.

2. A steering system according to claim 1, wherein said fourth means controls said rear wheels to be steered in opposite phase with said front wheels or substantially not steered while the motor vehicle is running at a relatively lower speed, and also controls said rear wheels to be steered in phase with said front wheels when the motor vehicle is running at a relatively higher speed; and
   when said shaft is horizontally positioned said rear wheels are not steered, when said swing shaft is downwardly tilting said rear wheels are steered in opposite phase to said front wheels, and when said swing shaft is upwardly tilting said rear wheels are steered in phase with said front wheels.

3. A steering system for front and rear wheels of a motor vehicle, comprising:
   (a) a steering wheel;
   (b) front wheels;
   (c) first means for steering said front wheels;
   (d) rear wheels;
   (e) second means for steering said rear wheels;
   (f) third means for transmitting the direction and extent of steering of said front wheels to said second means;
   (g) fourth means for controlling the steering ratio between said front and rear wheels in response to a signal related to the speed of the motor vehicle; and
   (h) each of said rear wheels having a kingpin having a central line which has an extension which is positioned rearwardly of a point where a vertical line passing through the center of an axle of said rear wheel intersects the ground on which the motor vehicle is disposed;
   said fourth means comprises an input shaft rotatable in response to operation of said steering wheel, a swing shaft swingably coupled to a rear end of said input shaft, a joint member loosely fitted over said swing shaft, rear wheel tie rods connected to said joint member and to said rear wheels, respectively, an arm member fixed to said rear wheels, respectively, an arm member fixed to said swing shaft and extending substantially perpendicularly to an axis of said swing shaft, drive means controllable in rotation in response to the speed of the motor vehicle, a slide member threaded over an output shaft of said drive means and slidable on said output shaft, and a link member operatively interconnecting said slide member and said arm member.

4. A steering system according to claim 1, wherein said fourth means further includes a position sensor for detecting the position of said swing shaft.

* * * * *

UNITED STATES PATENT AND TRADEMARK OFFICE
CERTIFICATE OF CORRECTION

PATENT NO. : 4,610,455
DATED : September 9, 1986
INVENTOR(S) : Yoshimi FURUKAWA et al It is certified that error appears in the above-identified patent and that said Letters Patent are hereby corrected as shown below:

Column 2, line 29, after "invention" insert a period;
          line 32, after "FIG. 1" insert a period;
          line 36, change "and" to a period;
          line 59, change "universal joint" to --yoke connection--;.
Column 4, line 10, change "wheel front" to --front wheels--;
          line 59, change "center" to --caster--.
Column 5, line 52 (claim 1, line 15) change "vertically" to --pivotally--.
Column 6, line 13 (claim 2, line 9), before "shaft" insert --swing--;
          lines 44-45 (claim 3, lines 26-27), delete "an arm member fixed to said rear wheels, respectively,".

Signed and Sealed this

Third Day of March, 1987

Attest:

DONALD J. QUIGG

Attesting Officer

Commissioner of Patents and Trademarks